US008836967B2

(12) United States Patent
Murayama

(10) Patent No.: US 8,836,967 B2
(45) Date of Patent: Sep. 16, 2014

(54) IMAGE FORMING APPARATUS AND COMPUTER READABLE MEDIUM HAVING COMPUTER PROGRAM PRODUCT FOR MEASURING AMOUNT OF MISMATCH STORED THEREON

(75) Inventor: Kentaro Murayama, Kasugai (JP)

(73) Assignee: Brother Kogyo Kabushiki Kaisha, Nagoya-shi , Aichi-ken (JP)

( * ) Notice: Subject to any disclaimer, the term of this patent is extended or adjusted under 35 U.S.C. 154(b) by 647 days.

(21) Appl. No.: 13/029,355

(22) Filed: Feb. 17, 2011

(65) Prior Publication Data

US 2011/0211216 A1 Sep. 1, 2011

(30) Foreign Application Priority Data

Feb. 26, 2010 (JP) ................................ 2010-041925

(51) Int. Cl.
*G06K 15/02* (2006.01)

(52) U.S. Cl.
USPC .............. 358/1.14; 358/504; 358/406; 399/9; 399/15; 399/44; 399/72

(58) Field of Classification Search
USPC ........... 358/1.14, 504, 406; 399/31, 33, 9, 15, 399/72, 44, 301
See application file for complete search history.

(56) References Cited

U.S. PATENT DOCUMENTS

| | | | | |
|---|---|---|---|---|
| 6,418,295 | B1 * | 7/2002 | Sato | 399/301 |
| 2001/0017645 | A1 * | 8/2001 | Toda | 347/116 |
| 2005/0053389 | A1 * | 3/2005 | Tanaka et al. | 399/66 |
| 2006/0029407 | A1 * | 2/2006 | Sakamoto | 399/44 |
| 2008/0292370 | A1 | 11/2008 | Murayama | |
| 2009/0087199 | A1 * | 4/2009 | Moro | 399/15 |
| 2013/0064580 | A1 * | 3/2013 | Igarashi et al. | 399/301 |

FOREIGN PATENT DOCUMENTS

| | | |
|---|---|---|
| JP | 2002-174992 | 6/2002 |
| JP | 2004-013101 | 1/2004 |
| JP | 2007-086439 | 4/2007 |
| JP | 2008-292811 | 12/2008 |

OTHER PUBLICATIONS

Notification of Reasons for Refusal for Japanese Patent Application No. 2010-041925 mailed on Jan. 24, 2012.

* cited by examiner

*Primary Examiner* — Mark Zimmerman
*Assistant Examiner* — Lawrence Wills
(74) *Attorney, Agent, or Firm* — Banner & Witcoff, Ltd.

(57) ABSTRACT

An image forming device includes an image forming section, a CPU and memory storing executable instructions that, when executed by the CPU, cause the image forming device to provide functions including a data acquisition section, a mismatch correction section and a control section. The data acquisition section is configured to acquire a variation in factor that causes a mismatch of a parameter. The control section is configured to estimate an amount of mismatch of the parameter based on the variation and to send a request for measuring the amount of mismatch to the mismatch correction section when the estimated amount is equal to or larger than a reference value. The control section is also configured to alter at least one of calculation factors used for estimating the amount of mismatch and the reference value according to the measured amount.

14 Claims, 11 Drawing Sheets

IMAGE FORMING APPARATUS AND COMPUTER READABLE MEDIUM HAVING COMPUTER PROGRAM PRODUCT FOR MEASURING AMOUNT OF MISMATCH STORED THEREON

CROSS REFERENCE TO RELATED APPLICATION

The application claims priority from Japanese Patent Application No. 2010-041925 filed on Feb. 26, 2010. The entire content of this priority application is incorporated herein by reference.

TECHNICAL FIELD

The present disclosure relates to an image forming apparatus having a function for correcting a formed image position or an image forming density and to a computer readable medium having a computer program product for measuring an amount of mismatch stored thereon.

BACKGROUND

An image forming apparatus having an image correction function for correcting a formed image position or an image forming density is known. In such an image forming apparatus, an amount of mismatch related to the formed image position or density is measured and the formed image portion or density is corrected such that the measured amount of mismatch decreases. Although frequent image corrections can maintain an image quality, they may cause inconveniences for a user, such as a long waiting time or an increased consumption of ink or toner.

From that point of view, in the known image forming apparatus, a variation in printed page count or elapsed time since the last image correction is obtained and an amount of mismatch is measured when the variation exceeds a reference value. When the certain number of pages is printed since the last image correction, a certain amount of mismatch is expected due to abrasions or vibrations of parts caused by printing operation. Conditions to determine whether the image correction is required are usually predefined so that a required image quality can be maintained even when the maximum amount of mismatch within an estimated rage is measured.

The conditions are defined based on an estimation that the maximum amount of mismatch is measured. If the estimated amount of mismatch is significantly different from an actual amount of mismatch, the image correction may be performed frequently even the actual amount of mismatch is too small to affect the image quality. Namely, unnecessary image corrections may be performed. The same problem occurs in the image forming density corrections.

SUMMARY

An image forming apparatus described here comprises an image forming section, a processing unit and memory storing executable instructions. The image forming section is configured to form an image. The memory storing executable instructions are organized into sections that, when executed by the processing unit, cause the apparatus to provide the following functions: a mismatch correction section, a data acquisition section and a control section. The mismatch correction section is configured to measure an amount of mismatch of at least one parameter related to an image formed by the image forming section, and to correct the parameter such that the measured amount of mismatch decreases. The data acquisition section is configured to acquire data on a variation in factor that causes the mismatch of the parameter. The control section is configured to estimate an amount of mismatch of the parameter based on the variation acquired by the data acquisition section, to control the mismatch correction section to measure the amount of mismatch according to the estimated amount equal to or larger than a reference value, and to execute an alteration of at least one of a calculation factor used for estimating the amount of mismatch of the parameter and the reference value based on the measured amount of mismatch.

A non-transitory computer readable medium having a computer program product for measuring an amount of mismatch is included in an image forming apparatus having an image forming section for forming an image. The computer program product described here comprises instructions for: acquiring a variation; estimating an amount of mismatch based on the variation; measuring an amount of mismatch when the estimated amount is equal to or larger than a reference value; and altering a value according to the measure amount. More specifically, the program comprises instructions for:

acquiring the variation in factor that causes the mismatch of at least one parameter related to an image formed by an image forming section;

estimating an amount of mismatch of the parameter based on the variation;

measuring an amount of mismatch of the parameter when the estimated amount of mismatch of the parameter is equal to or larger than the reference value; and altering at least one of a calculation factor used for estimating the amount of mismatch of the parameter and the reference value according to the measured amount of mismatch of the parameter.

BRIEF DESCRIPTION OF THE DRAWINGS

Illustrative aspects in accordance with the present invention will be described in detail with reference to the following drawings wherein.

DETAILED DESCRIPTION

<Illustrative Aspect>

An illustrative aspect of the present invention will be explained with reference to FIGS. 1 to 11.

General Construction of Printer

Figure 1:
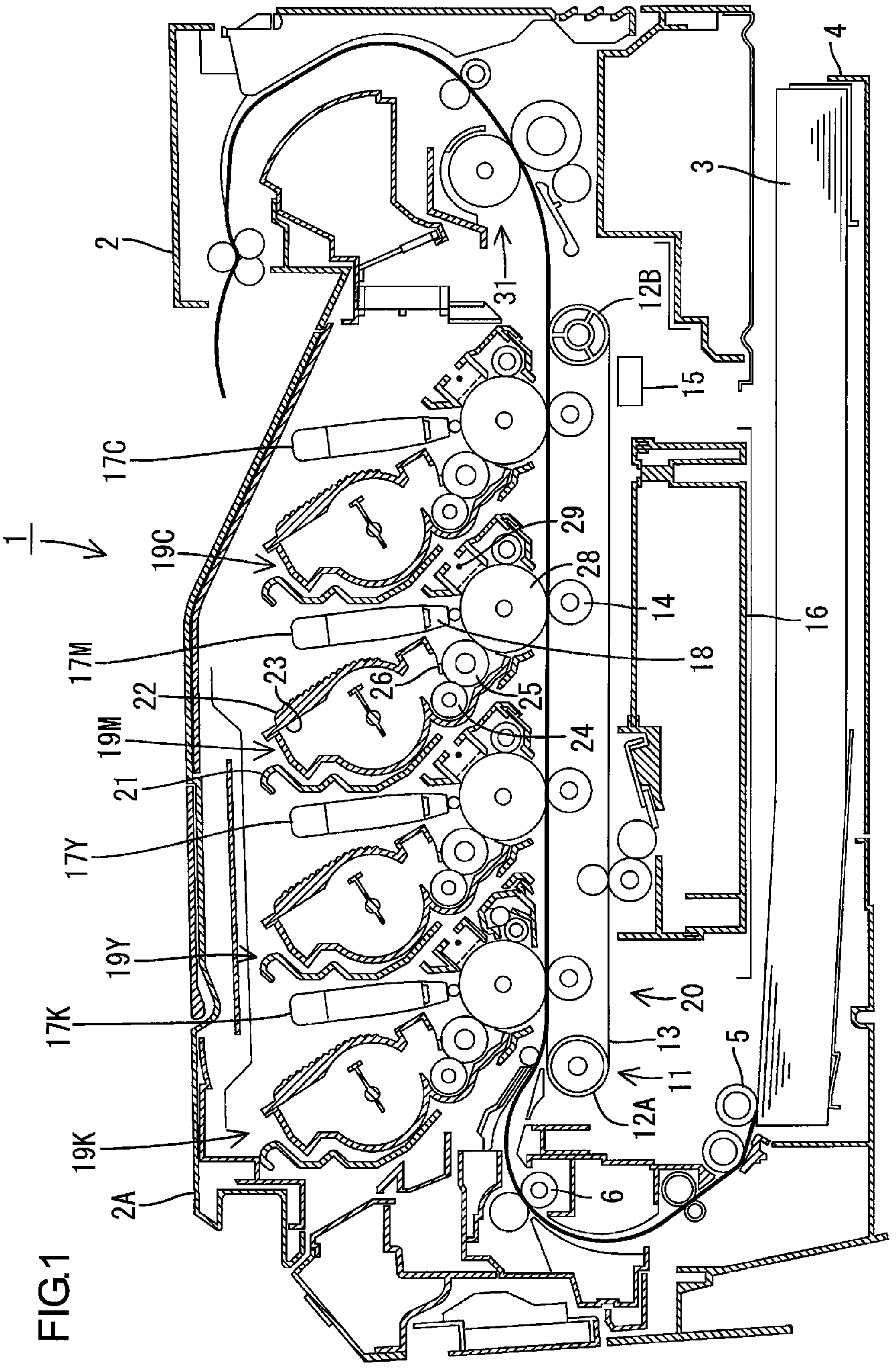
FIG. 1 is a side sectional view illustrating the general construction of a printer according to one of the illustrative aspects of the invention.

A color laser printer 1 illustrated in FIG. 1 is an example of an image forming apparatus of the present invention. The printer 1 is a direct tandem type color printer that forms color images using four colors of toner including black (K), yellow (Y), magenta (M) and cyan (C). The left side of FIG. 1 corresponds to the front side of the printer 1. In FIG. 1, symbols are not present for the parts that are the same as those used for one particular color and indicated by symbols.

The printer 1 includes a casing 2 and an openable cover 2A arranged at the top of the casing 2. At the bottom of the casing 2, a paper feed tray 4 is arranged. Sheets 3 are stacked in the paper feed tray 4. The top sheet 3 in the paper feed tray 4 is passed to the registration rollers 6 by a pickup roller 5 and then onto a belt unit 11 in an image forming section 20.

The image forming section 20 includes the belt unit 11, exposure units 17K to 17C, processing units 19K to 19C and a fusser 31.

The belt unit 11 is configured such that a belt 13 is stretched and looped over a belt support roller 12A located in the front and a belt drive roller 12B located in the rear. The belt 13 is made of polycarbonate and the outer peripheral surface thereof is mirror finished. The belt 13 rolls clockwise as the belt drive roller 12B revolves and the sheet 3 electrostatically adsorbed to the top surface of the belt 13 is passed to the rear.

Inside a loop of the belt 13, the transfer rollers 14 are arranged on an opposite side of the belt 13 from a side where photosensitive drums 28 are arranged in the respective processing units 19K to 19C, which will be explained later. The belt unit 11 is accessible by opening the cover 2A and removing all processing units 19K to 19C, and can be removed from the casing 2.

A pattern sensor 15 is provided for detecting patterns formed on the belt 13 during the measurement of the amount of position mismatch, which will be explained later. The pattern sensor 15 is arranged so as to face the lower surface of the belt 13. A detail about the configuration of the pattern sensor 15 will be provided later. Under the belt unit 11, a cleaner 16 is provided for collecting toner including that forms patterns) or paper residues attached to the surface of the belt 13.

Above the belt unit 11, four exposure units 17K, 17Y, 17M and 17C and four processing units 19K, 19Y, 19M and 19C are arranged alternately in the font-to-back direction. Each of the exposure units 17K to 17C is supported by the lower surface of the cover 2A. It has an LED head 18 including a plurality of LEDs arranged in line at the bottom end thereof. The light emissions of the exposure units 17K to 17C are controlled based on respective image data. The exposure units 17K to 17C emit light from the respective LED heads 18 to the surfaces of the respective photosensitive drums 28 for each line for scanning.

Each of the processing units 19K to 19C includes a cartridge frame 21 and a removable development cartridge 22 placed in the frame 21. When the cover 2A is open, the exposure units 17K to 17C are lifted by the cover 2A and the processing units 19K to 19C can be individually removed from the casing 2.

Each development cartridge 22 includes a toner container 23, a feed roller 24, a development roller 25 and a layer thickness control blade 26. The feed roller 24, the development roller 25 and the layer thickness control blade 26 are arranged in the lower portion of the development cartridge 22. The toner particles ejected from the toner container 23 are passed to the development roller 25 by the feed roller 24, and positively charged due to triboelectricity produced between the feed roller 24 and the respective development roller 25. The toner particles form a thin layer on the development roller 25 after smoothed out by the layer thickness control blade 26 and more positively triboelectrically charged.

In the lower part of each cartridge frame 21, the photosensitive drum 28 and a scorotron type charger 29 are provided. The surface of the photosensitive drum 28 is covered by a positively charged photosensitive layer. It is positively charged by the photosensitive drum 28 and exposed through scanning by the corresponding exposure unit 17K, 17Y, 17M or 17C. As a result, an electrostatic latent image is formed. When the toner particles passed from the development roller 25 to the electrostatic latent image, a toner image (a developer image) is formed on the photosensitive drum 28.

A negative transfer voltage is applied to the transfer roller 14. The sheet 3 is passed through between the photosensitive drum 28 and the transfer roller 14. When it passes through a transfer point, the toner image on the photosensitive drum 28 is transferred onto the sheet 3 due to the negative transfer voltage. This process is performed by all processing units 19K to 19C. The sheet 3 on which the toner images are transferred is passed to the fuser 31 and the toner images are thermally fixed. Then, it is ejected onto the top surface of the cover 2A.

Electrical Configuration of Printer

Figure 2:
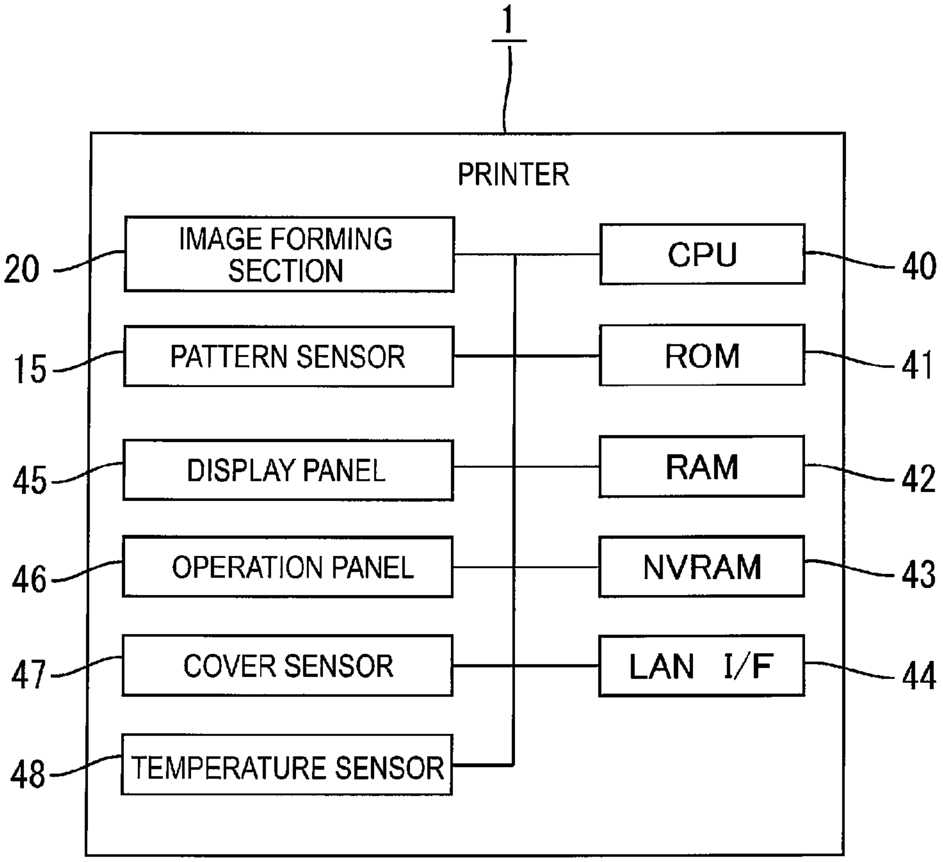
FIG. 2 is a block diagram schematically illustrating an electrical configuration of the printer.

The printer 1 has an electrical configuration illustrated in FIG. 2.

As illustrated in FIG. 2, the printer 1 includes a CPU 40, a ROM 41 and a RAM 42, an EVRAM 43, which is a nonvolatile memory, and a network interface 44. The image forming section 20 and the pattern sensor 15 are connected to these components.

The ROM 41 stores programs for executing various operations of the printer 1 including a cover related process and a process for correcting the amount of mismatch per unit. The CPU 40 controls relevant parts of the printer 1 according to the program read from the ROM 41 while writing the results of the process in the RAM 42 or the NVRAM 43. The network interface 44 is connected to an external computer (not shown) via a communication line so that communication between them is available.

The printer 1 also includes a display panel 45 and an operation panel 46. The display panel 45 includes a liquid crystal display and a lamp. It displays setting screens and operating conditions of the printer 1. The operation panel 46 includes a plurality of buttons through which a user can perform input operations.

The printer 1 further includes a cover sensor 47 for detecting open or close of the cover 2A and a temperature sensor 48 for detecting a temperature inside the printer 1. The cover sensor 47 and the temperature sensor 48 are examples of data acquisition section of claimed technology of this application.

Pattern Sensor

Figure 3:
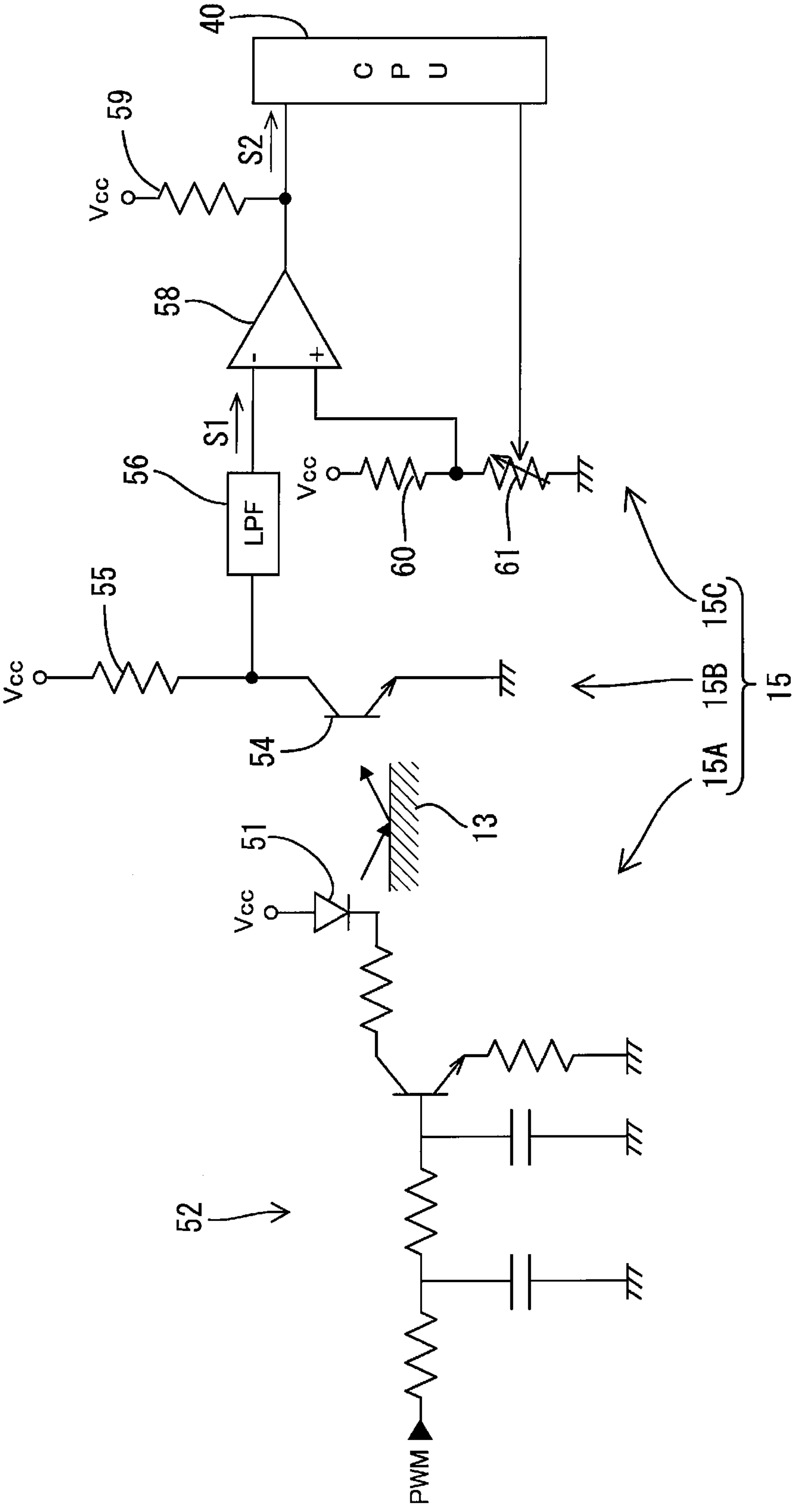
FIG. 3 is a circuit diagram illustrating a pattern sensor.

As illustrated in FIG. 3, the pattern sensor 15 includes a phototransmitter circuit 15A, a photoreceptor circuit 15B and a comparator circuit 15C. The phototransmitter circuit 15A includes a phototransmitter element 51 that emits light toward the belt 13. The photoreceptor circuit 15B includes a photoreceptor element 54 that receives reflected light off the belt 13. The comparator circuit 15C compares an output from the photoreceptor circuit 15B with a reference voltage.

In the phototransmitter circuit 15A, the cathode of the phototransmitter element 51, which is an LED, is connected to a PWM signal smoothing circuit 52 and an anode is connected to a power supply line Vcc. The CPU 40 sends a PWM signal (a control signal) to the PWM signal smoothing circuit 52. It adjusts a current that flows through the phototransmitter element 51 by changing a PWM value (a duty ratio) of the PWM signal to adjust the amount of light output from the phototransmitter circuit 15A.

In the photoreceptor circuit 15B, the emitter of the photoreceptor element 54, which is a phototransistor, is grounded and the collector is connected to the power supply line Vcc via a resistor 55. A photoreceptor signal S1 at a level (a voltage) corresponding to the amount of the received light reflected off the belt 13 is output from the collector of the photoreceptor element 54 and input to the comparator circuit 15C after passed through a low-pass filter 56. The low-pass filter 56 is a CR filter or an LC filter provided for reducing a spark noise of the signal S1.

The comparator circuit 15C includes an operational amplifier 58, resistors 59, 60 and a variable resistor 61. The output terminal of the low-pass filter 56 is connected to a negative input terminal of the operational amplifier 58. An output terminal of the operational amplifier 58 is connected to the power supply line Vcc via the pull-up resistor 59 and also to the CPU 40. A voltage output of the voltage divider circuit including the resistors 60 and 61 is provided as a reference voltage. The CPU 40 sets the reference voltage by changing the resistance of the variable resistor 61. With this configuration, the operational amplifier 58 compares the voltage of the photoreceptor signal S1 input to the negative input thereof with the reference voltage and inputs a binary signal S2 corresponding to the result of the comparison to the CPU 40.

Causes of Position Mismatch and Calculations of Amount of Mismatch for Different Causes The CPU 40 can execute position mismatch correction for correcting a vertical position mismatch between a position on the sheet 3 that is carried by the belt 13, at which an image is supposed to be formed by the corresponding processing unit and an actual position. The position on the sheet 3 at which an image is supposed to be formed is referred to as an image forming position and an example of a parameter. The vertical position mismatch is a shift in a direction of vertical scanning, which is perpendicular to a direction in which the LEDs of the LED head are arranged and substantially same as a direction in which the sheet 3 is conveyed by the belt 13. Various factors can be considered as causes of the position mismatch of the image forming position. In this example, the case of the position mismatch caused by the opening and closing of the cover 2A and a temperature change inside the casing 2 will be explained.

When the cover 2A is open and closed, a relative position of the LED head 18 of each exposure unit 17 to the corresponding photosensitive drum 28 may be shifted. As a result, the image forming position may be also shifted. The amount of mismatch caused by the opening and closing of the cover 2A is estimated using Equation 1. This is an example of the estimated amounts of mismatches for different factors and referred to as an estimated amount of mismatch caused by opening and closing of the cover.

$$A_{EC}=\alpha\times N_C \qquad (1)$$

Where $A_{EC}$ is an estimated amount of mismatch caused by opening and closing of the cover, α is an amount of mismatch per opening and closing of the cover 2A, $N_C$ is the number of total times of opening and closing of the cover 2A since the last position mismatch correction. The amount of position mismatch per opening and closing of the cover 2A corresponds to a unit amount of mismatch. α is also a coefficient (or a gradient) for calculating the estimated amount of mismatch caused by the opening and closing the cover 2A, and corresponds to a calculation factor. The default of the coefficient α is defined in the manufacturing process of the printer 1 based on results of experiments. The CPU 40 counts the total of the opening and closing the cover based on detection signals that indicate the opening and closing of the cover 2A sent from the cover sensor 47. It stores the current total in the NVRAM 43.

If the temperature inside the casing 2 changes, optical characteristics of the exposure units 17 may vary according to the temperature change and this may cause the image forming position mismatch. An estimated amount of mismatch caused by the temperature change (hereinafter referred to as the amount of mismatch caused by temperature change) is calculated by Equation 2. The amount of mismatch caused by temperature change is an example of the estimated amounts of mismatches for different factors.

$$A_{ET}=\beta\times\Delta T \qquad (2)$$

Where $A_{ET}$ is the amount of mismatch caused by the temperature change, β is the amount of mismatch per a unit variation in temperature and a gradient (or a coefficient) for calculating the estimated amount of mismatch caused by temperature change, and ΔT is a variation in temperature since the last position mismatch correction. The coefficient β (β1, β2) is an example of the unit amount of mismatch and an example of the calculation factor. The default (β1) of the coefficient β is defined in the manufacturing process of the printer 1 based on results of experiments. The CPU 40 obtains the temperature during the last position mismatch correction based on a detection signal sent from the temperature sensor 48. It determines the obtained temperature as a default and stores in the NVRAM 43.

Cover Related Process and Temperature Change Related Process

Figure 4:
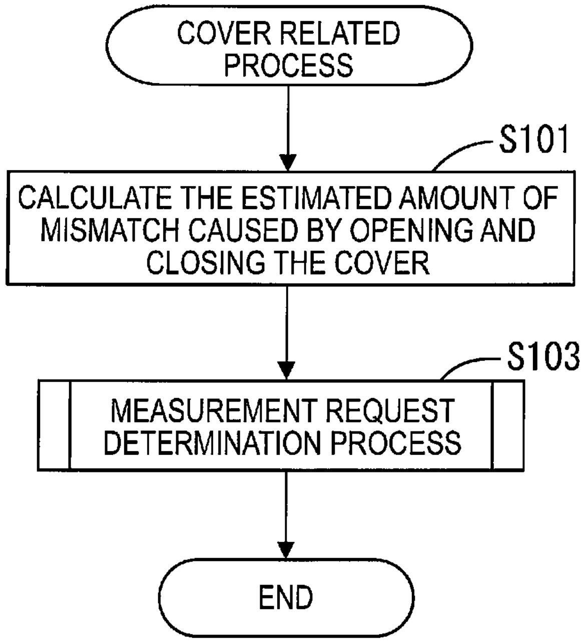
FIG. 4 is a flowchart illustrating a cover related process.
Figure 5:
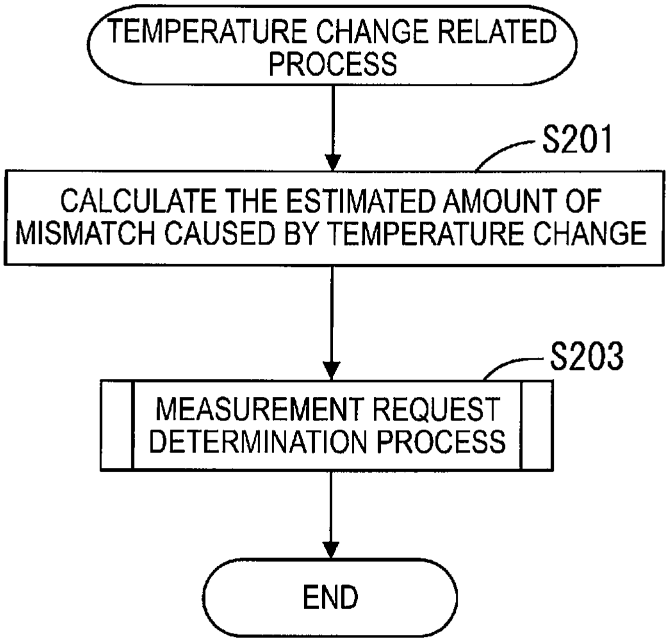
FIG. 5 is flowchart illustrating a temperature change related process.

A cover related process and a temperature change related process are illustrated in FIG. 4 and FIG. 5, respectively.

The CPU 40 executes the cover related process when it receives the detection signal that indicates opening and closing of the cover 2A from the cover sensor 47. Specifically, the CPU 40 reads the current coefficient α and the current total of opening and closing of the cover 2A from the NVRAM 43, and then it calculates the estimated amount of mismatch caused by opening and closing the cover using Equation 1 (S101). It stores the calculation result in the NVRAM 43 and executes a measurement request determination process (S103).

The CPU 40 executes the temperature change related process only when a condition that the temperature inside the casing 2 changes by a predetermined amount is determined based on the detection signal from the temperature sensor 48. The predetermined amount of temperature is preferably set to a value larger than the unit variation in temperature. Specifically, the CPU 40 reads the coefficient β and the temperature defined at the last position mismatch correction from the NVRAM 43 and calculates the estimated amount of mismatch caused by temperature change using Equation 2 (S201). It stores the calculation result in the NVRAM 43 and executes a measurement request determination process in the same manner as step S103 (S203).

Measurement Request Determination Process

Figure 6:
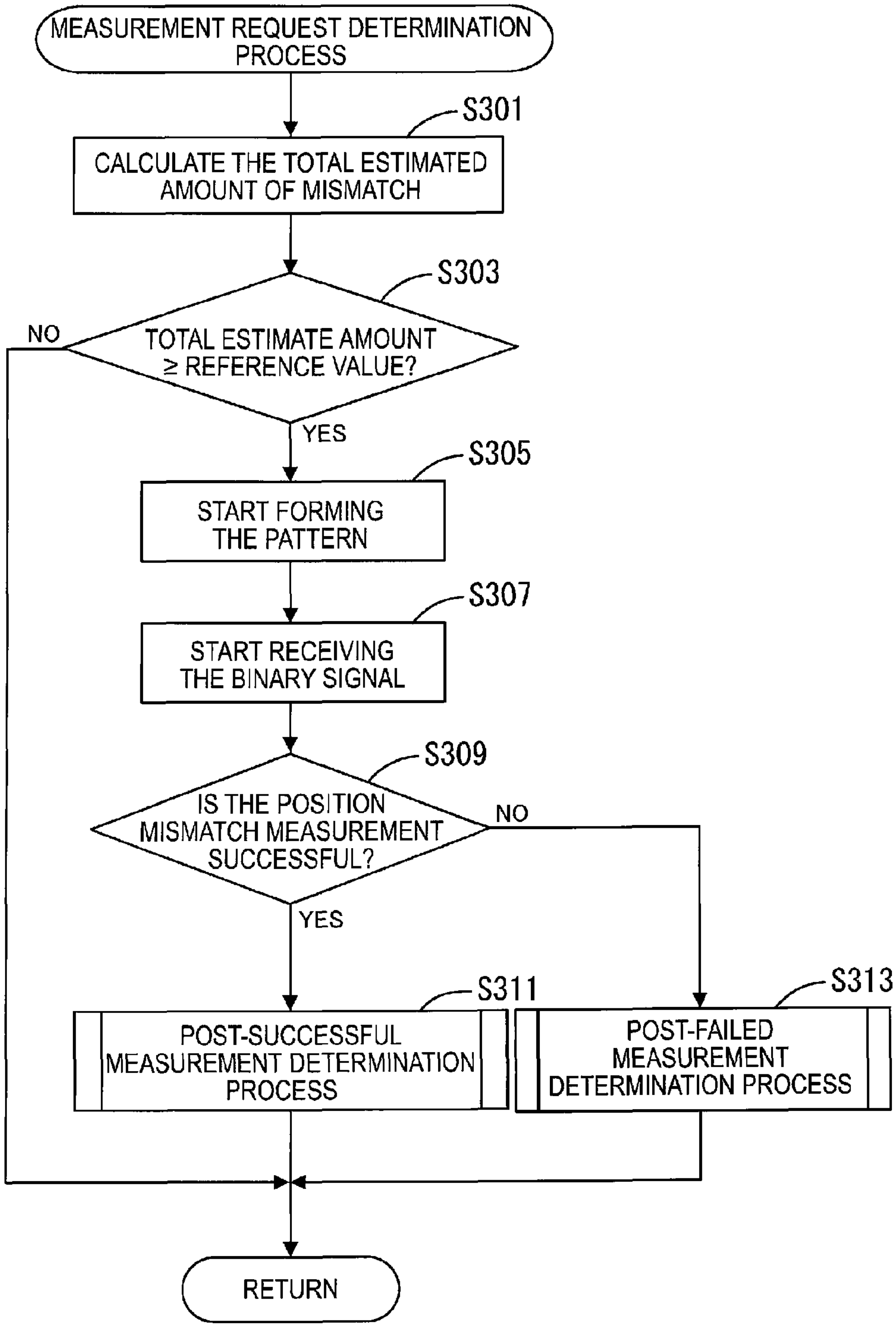
FIG. 6 is a flowchart illustrating a measurement request determination process.

The measurement request determination process is illustrated in FIG. 6. In this process, the CPU 40 determines whether to send a request for measuring the amount of position mismatch of the image forming position used for the position mismatch correction. In this case, the CPU 40 functions as a controller of the claimed technology of this application. The measurement of the amount of position mismatch of the image forming position may be referred to as a position mismatch measurement hereinafter.

The CPU 40 reads the current estimated amount of mismatch caused by opening and closing the cover and that of mismatch caused by temperature change from the NVRAM 43, and calculates an estimated total amount of mismatch by adding them up (S301). This calculation is expressed by the following equation: the estimated total amount of mismatch=the amount of mismatch caused by opening and closing the cover+the amount of mismatch caused by temperature change. Then, the CPU 40 stores the estimated total amount of mismatch in the NVRAM 43. Next, the CPU 40 determines whether the estimated total amount of mismatch is equal to or larger than a predetermined reference value (S303). The reference value is determined within a range so that a required image quality can be maintained even when the largest amount of mismatch within a range assumed based on experiments in the manufacturing process of the printer 1 occurs. For example, the reference value is determined in the range between 150 μm and 200 μm.

If the CPU 40 determines that the estimated total amount of mismatch is smaller than the reference value (NO in S303), it assumes that an actual amount of position mismatch is also smaller than the reference value and the position mismatch correction is not necessary. Thus, it terminates the measurement request determination process and the process for mismatch caused by opening and closing of the cover or by temperature change.

If the CPU 40 determines that the estimated total amount of mismatch is equal to or lager than the reference value (YES in S303), it assumes that an actual amount of position mismatch is also equal to or larger than the reference value and the position mismatch correction is necessary. Then, it drives the belt 13 to rotate and controls the image forming section 20 to start forming a pattern P for position mismatch measurement on the belt 13 (S305), and starts receiving the binary signal S2 from the pattern sensor 15 (S307).

Figure 7:
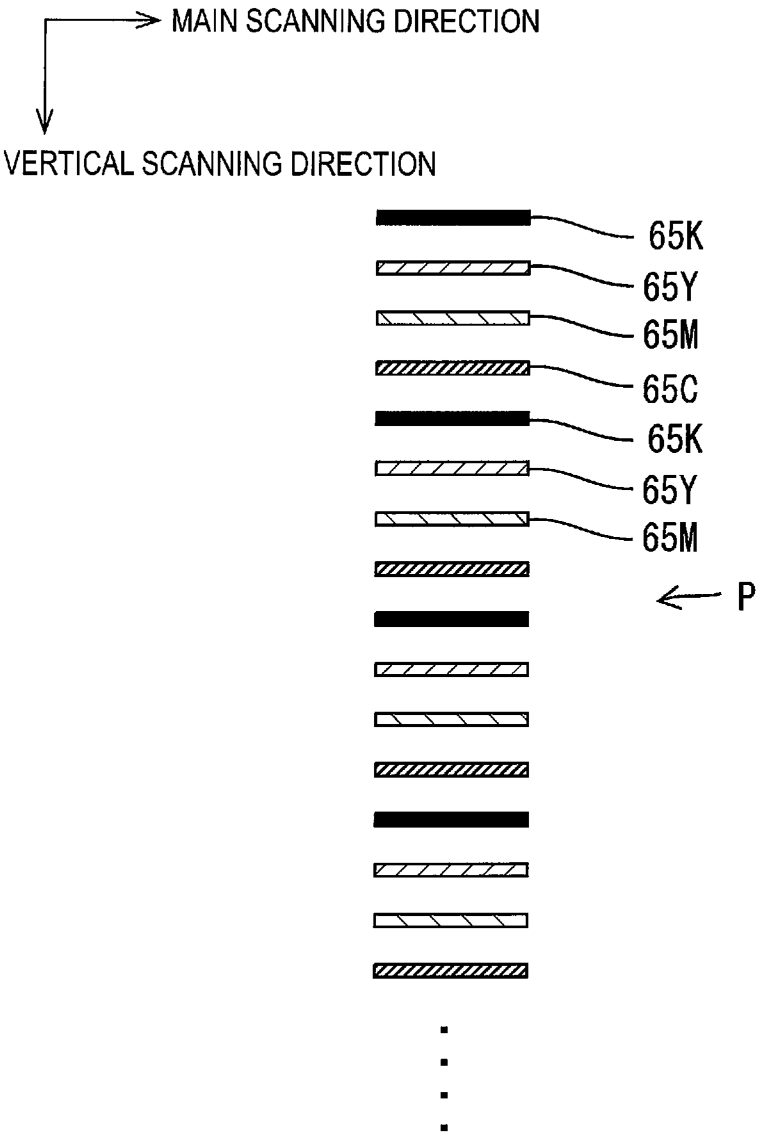
FIG. 7 is patterns for a measurement of a position mismatch.

The pattern P includes longitudinal marks 65K, 65Y, 65M and 65C in respective colors illustrated in FIG. 7. Each mark extends in the main scanning direction, which is perpendicular to the direction of vertical scanning explained earlier and substantially same as the direction in which the LEDs of the LED head 18 are arranged. The black, yellow, magenta and cyan marks 65K to 65C are formed in this order apart from each other in the vertical scanning direction (substantially perpendicular to the main scanning direction). A plurality of groups of these marks are formed on the belt 13 all around. If the marks 65K to 65C are formed at defined position without mismatch, the intervals between the marks 65K to 65C are equal.

The CPU 40 determines positions of the marks 65K to 65C based on reference locations of the marks 65K to 65C defined in relation to states of the binary signals S2. For example, a location at which corresponding one of the marks 65K to 65C is located at a middle of time between a rising edge and a falling edge of the binary signal S2 is defined as a location of that mark 65K, 65Y, 65M or 65C. The reference locations are defined for all marks in the same manner.

If noises appear in the binary signals S2 due to scratches on the belt 13 or other reasons or parts of the marks 65 are missing due to insufficient amounts of the toner, the accuracies in the position determinations of the marks 65 may decrease. Therefore, the CPU 40 determines whether the position mismatch measurement is successful based on the results of the position determinations (S309). The CPU 40 determines whether the amounts of mismatches can be measured based on the results of the determinations of the positions of the marks 65. Alternatively, it determines based on whether the accuracies can be maintained above a predetermined level, which could be lower than an accuracy corresponding the required image quality.

Specifically, the CUP 40 determines that the position mismatch measurement is successful if the marks 65 or the groups of the marks 65 that are defined as at proper positions are equal to or more than a specific number. If they are less than the specific number, the CPU 40 determines that the position mismatch measurement is failed. Whether the marks 65 are located at the proper positions can be determined by any one of the following processes.

Determination method 1: the marks 65 are determined as at proper positions if pulse widths of the binary signal S2 corresponding to the marks 65 are within a specified range.

Determination method 2: the marks 65 are determined as at proper positions if widths of pulses before and after a pulse that corresponds the specific one of the marks 65, that is, the pulses that correspond to where no marks are present are within a specified range.

Determination method 3: the marks 65 are determined as at proper positions if the amount mismatch of each group (all marks 65 in this group) in the vertical scanning direction is within a specific range. The CPU 40 determines the amounts of position mismatches of the color marks 65Y, 65M, 65C (color mismatch amount) other than the black mark 65K in the vertical scanning direction using the black mark 65K as a reference. The color marks 65Y, 65M and 65C are referred to as correction colors and the amount of position mismatch of each group is referred to as a group position mismatch amount hereinafter.

Determination method 4: the marks 65 are determined as at proper positions if the number of pulses corresponding to the marks 65 in each group is equal to a theoretical number, which is four in this example.

If the position mismatch measurement is determined as successful (YES in S309), the CPU 40 executes a post-successful measurement determination process (S311). If it is determined as failed (NO in S309), the CPU 40 executes a post-failed measurement determination process (S313).

Post-Successful Measurement Determination Process

Figure 8:
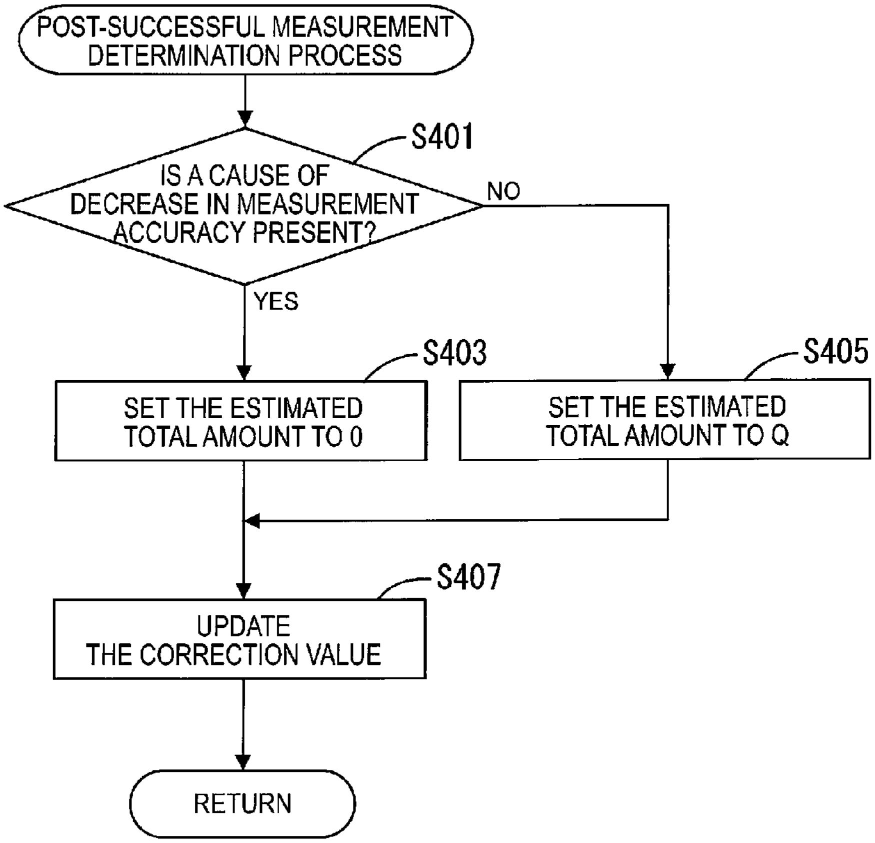
FIG. 8 is a flowchart illustrating a post-successful measurement determination process.

The post-successful measurement determination process is illustrated in FIG. 8. The CPU 40 determines whether a cause of decrease in measurement accuracy is present (S401). If the number of marks or the number of groups of marks that are located at improper positions is smaller than the specified number (e.g., 1) in S309 illustrated in FIG. 6, the cause of decrease in the measurement accuracy is not present (YES in S401). Namely, the accuracy is determined as high according to the result of this position mismatch measurement and thus the CPU 40 determines that the amount of mismatch of the image forming position can be defined as substantially zero. Therefore, the CPU 40 sets the estimated total amount currently stored in the NVRAM 43 to zero, that is, the estimated total amount is initialized (S403).

The CPU 40 also sets the total number of opening and closing of the cover, which is currently stored in the NVRAM 43, to zero, that is, the number is initialized, and obtains the current temperature based on the detection signal from the temperature sensor 48. Then, it stores the temperature in the NVRAM 43 as an initial temperature. The estimated total amount of mismatch increases every time the cover related process or the temperature change related process is performed as the total number of times the cover 2A is open and closed or the temperature varies from the initial temperature.

If the number of marks 65 or the number of groups of the marks 65 that are located at improper positions is equal to or larger than the specified number, sufficient pieces of data that can be used for the measurements of the amounts of mismatch for the image forming positions of the marks 65 cannot be obtained. Therefore, the CPU 40 determines that the cause of decrease in the measurement accuracy is present (NO in S401). Namely, it determines that the amounts of mismatch of the image forming positions cannot be set to substantially zero based on the result of the measurement because of the decrease in the measurement accuracy. Therefore, it sets the estimated total amount store in the NVRAM 43 to value Q that is defined according to the decrease in the measurement accuracy instead of zero (S405). The value Q may be defined according to the number of marks 65 or the number of groups of marks 65 that are located at improper positions. In this case, the value Q is calculated by multiplying the number of marks 65 or groups by the number corresponding to a specified amount of mismatch, such as 10 μm.

The CPU 40 sets the total number of opening and closing of the cover currently stored in the NVRAM 43 is set to zero and obtains the current temperature based on the detection signal from the temperature sensor 48. It stores the temperature in the NVRAM 43 as an initial temperature. The estimated total amount increases from the value Q according to the total number of opening and closing of the cover or the temperature change from the initial temperature.

Next, the CPU 40 calculates a correction value for the mismatch of the image forming position based on the result of measurement for the group of marks 65 that are determined as being located at proper positions in S309, and updates the correction value with the calculated correction value (S407). Specifically, the CPU 40 performs the correction of the amounts of position mismatch for the correction colors as follows. The CPU 40 calculates an average of the marks 65 in each color in all groups that are determined as within the proper position range and then a new correction value for compensating for the amount of mismatch. It updates the correction value store in the NVRAM 43 with the new correction value for each correction color and completes the position correction. Then, it completes the post-successful measurement determination process.

Post-Failed Measurement Determination Process

Figure 9:
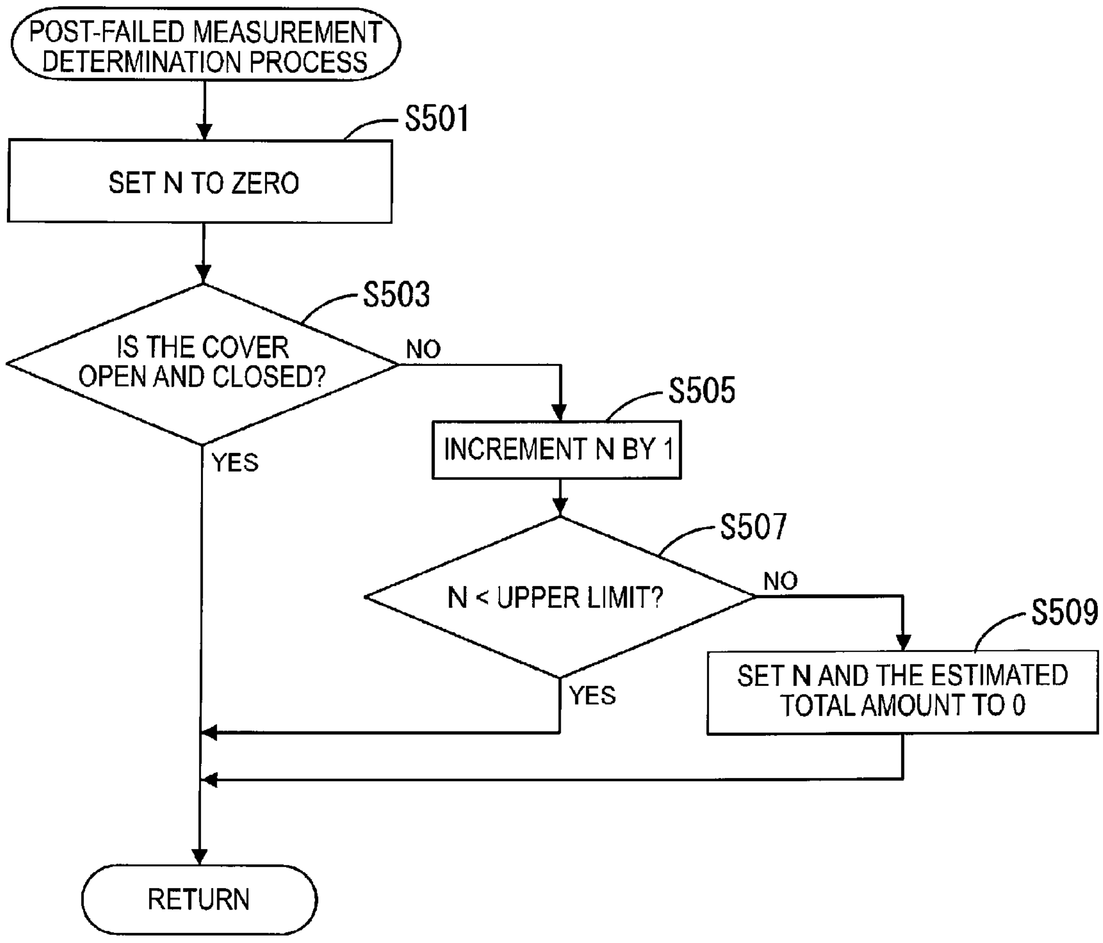
FIG. 9 is a flowchart illustrating a post-failed measurement determination process.

The post-failed measurement determination process is illustrated in FIG. 9. The CPU 40 sets the number of consecutive times that the measurement of the amount of position mismatch is determined as failed in S309 (N=the consecutive number of times of failure) to zero (S501). It determines whether the cover 2A is open during the measurement of position mismatch based on the detection signal from the temperature sensor 48. If the cover 2A is open (YES in S503), the CPU 40 determines that the measurement is failed due to the opening and closing of the cover 2A and terminates the post-failed measurement determination process.

If the cover 2A is not open during the measurement (NO in S503), the CPU 40 determines that the cause of the failed measurement is not the opening and closing of the cover 2A and increments N by 1 (S505). If N is smaller than the upper limit, for example, smaller than 2 (YES in S507), the CPU 40 terminates the process. If the cover 2A is open and closed during the measurement (YES in S503) and N is smaller than the upper limit (YES in S507), the CPU 40 terminates the process without initializing the total number of opening and closing of the cover 2A, updating the initial temperature and initializing the estimated total amount of mismatch.

If N exceeds the upper limit (NO in S507), the CPU 40 completes the process after initializing the total number of opening and closing of the cover 2A, updating the initial temperature and initializing the estimated total amount of mismatch. This prevents that the estimated total amount remains without being initialized because the measurement is repeatedly failed.

If the post—failed measurement determination process is executed, the CUP 40 does not update the correction value unlike during the post-successful measurement determination process, and terminates the cover related process or the temperature change related process.

Correction of Unit Amount of Mismatch

Figure 10:
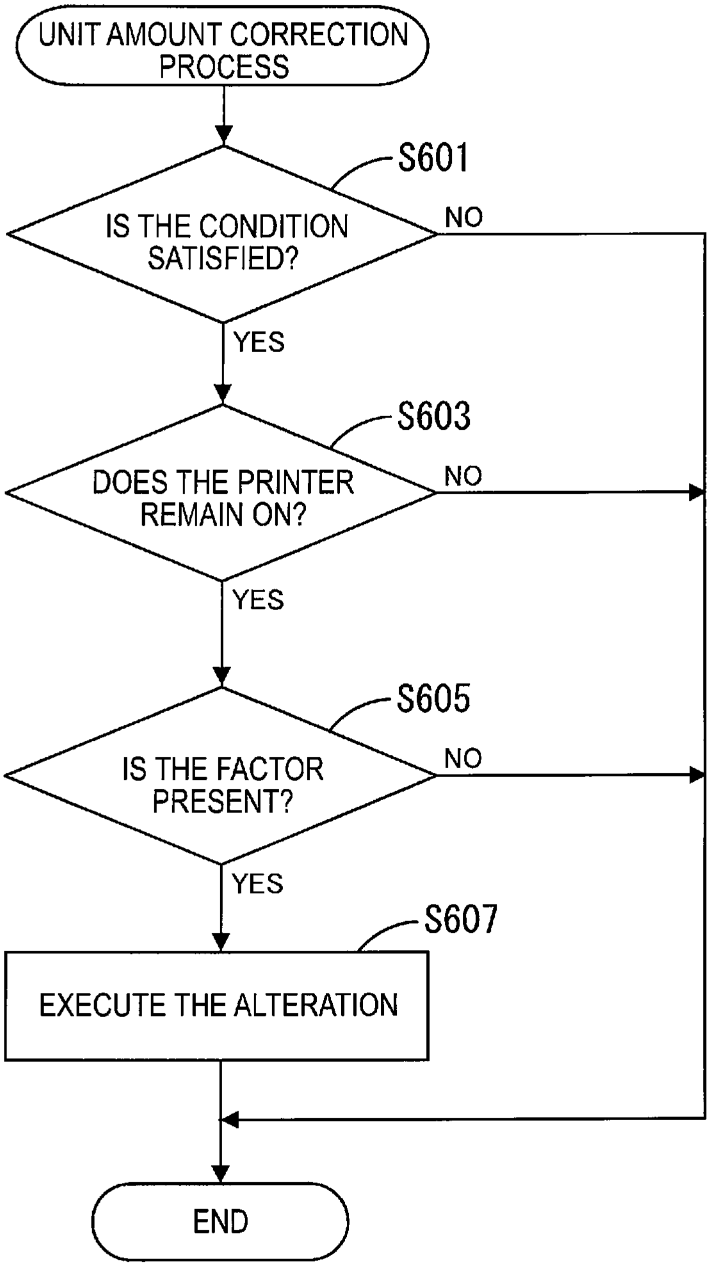
FIG. 10 is a flowchart illustrating a process for correcting the amount of mismatch per unit.

The process for correcting the unit amount of mismatch is illustrated in FIG. 10. The CPU 40 periodically executes the correction process of the unit amount of mismatch. It firstly determines whether at least one of the following conditions for execution of the process is satisfied (S601).

Condition 1: a value related to operations of the printer 1 is equal to or higher than a specified value.

The value related to operations of the printer 1 is defined based on the elapse time since the reference time such as a start of use, the total printing time, the number of times that the printing is executed, the number of sheets 3 printed, the rotation of the rotation component (e.g., the belt 13 and the photosensitive drum 28) or the amount of toner used.

Condition 2: the number of the measurement of position mismatch executed is equal to or larger than a specified value.

If none of the above conditions is satisfied (NO in S601), the CPU 40 terminates this process. If at least one of the above conditions is satisfied (YES in S601), the CPU 40 determines whether the printer 1 remains on since the last measurement of the amount of mismatch (S603). If the printer 1 is turned off at least once (NO in S603), the CPU 40 terminates this process. This is because the opening and closing of the cover 2A cannot be detected while the printer 1 is turned off and thus the estimated total amount of mismatch from the last measurement of the amount of position mismatch cannot be properly calculated.

If the printer 1 is not turned off at all (YES in S603), the CPU 40 determines whether a factor related to the estimated amount that takes a large proportion of the estimated total amount of mismatch is present (S605). The large proportion of the estimated total amount of mismatch is defined when the percentage of the estimated amount in the estimated total amount is larger than a reference percentage. The proportion is calculated by the following formula: (the estimated amount of mismatch related to the factor/the estimated total amount)× 100. The reference percentage is preferably set to 50% or higher. If the factor is present (YES in S605), the CPU 40 executes an alteration of the unit amount α or β of mismatch related to the factor (S607).

Specifically, the CPU 40 alters the unit amount of mismatch related to the factor based on the current estimated total amount of mismatch and the amount of mismatch of the image forming position measured in the last measurement (hereinafter referred to as the measured amount of mismatch). More specifically, the CPU 40 alters the unit amount according to the difference between the current estimated total amount and the measured amount of mismatch using Equation 3 provided below.

$$A_U = A_C - [(A_E - A_M) \times P_H / 100]] / V_H \quad (3)$$

Were $A_U$ is a unit amount of mismatch, $A_C$ is a current unit amount of mismatch, $A_E$ is a current estimated total amount, $A_M$ is a measured amount of mismatch, $P_H$ is a percentage of the amount that takes a large proportion, and $V_H$ is a variation in factor that causes the mismatch with the amount that takes the large proportion of the estimated total amount.

Using equation 3, the CPU 40 alters the unit amount of mismatch to a value smaller than the current value if the current total amount of mismatch is larger than the measured amount, and to a value larger than the current value if the current total amount of mismatch is smaller than the measured amount. Then, the CPU 40 completes this process. In the temperature change related process from now on, the CPU 40 calculates the estimated amount of mismatch caused by the temperature change and the estimated total amount based on the unit amount (β2) of mismatch after the alteration. Then, it executes the measurement request determination process.

If all conditions checked in S601 to 607 are satisfied, in the first alteration step, the CPU 40 uses the measured amount of mismatch obtained in the measurement executed previously before the printer 1 is put in the state that satisfies the above conditions, which is preferably the one that is obtained in the last measurement. With this configuration, the estimated amount of mismatch remains constant before and after the first alteration step in comparison to the case that an unrelated value to the measured amount of mismatch obtained in the measurement without the alteration.

More detailed description will be provided using the following conditions.

α=20 μm/time

β(β1)=20 μm/° C.

Total number of times of opening and closing of the cover=1

Temperature change=10° C.

Reference amount of mismatch=200 μm

Measured amount of mismatch=150 μm

Reference percentage=90%

Under the conditions, the estimated amount of mismatch caused by the opening and closing of the cover is 20 μm and the estimated amount of mismatch caused by the temperature change is 200 μm. Therefore, the estimated total amount of mismatch is 220 μm. The estimated total amount is larger than the reference amount and thus the measurement of the amount of position mismatch is executed. The estimated total amount is significantly larger than the measured amount of mismatch obtained in the current measurement, which is 150 μm. The difference between the estimated total amount and the measured amount is 70 μm. Namely, the estimated total amount is larger than the reference amount although the measured amount is still smaller than the reference amount. Therefore, the measurement of the amount of position mismatch is executed at unnecessarily early timing.

Figure 11:
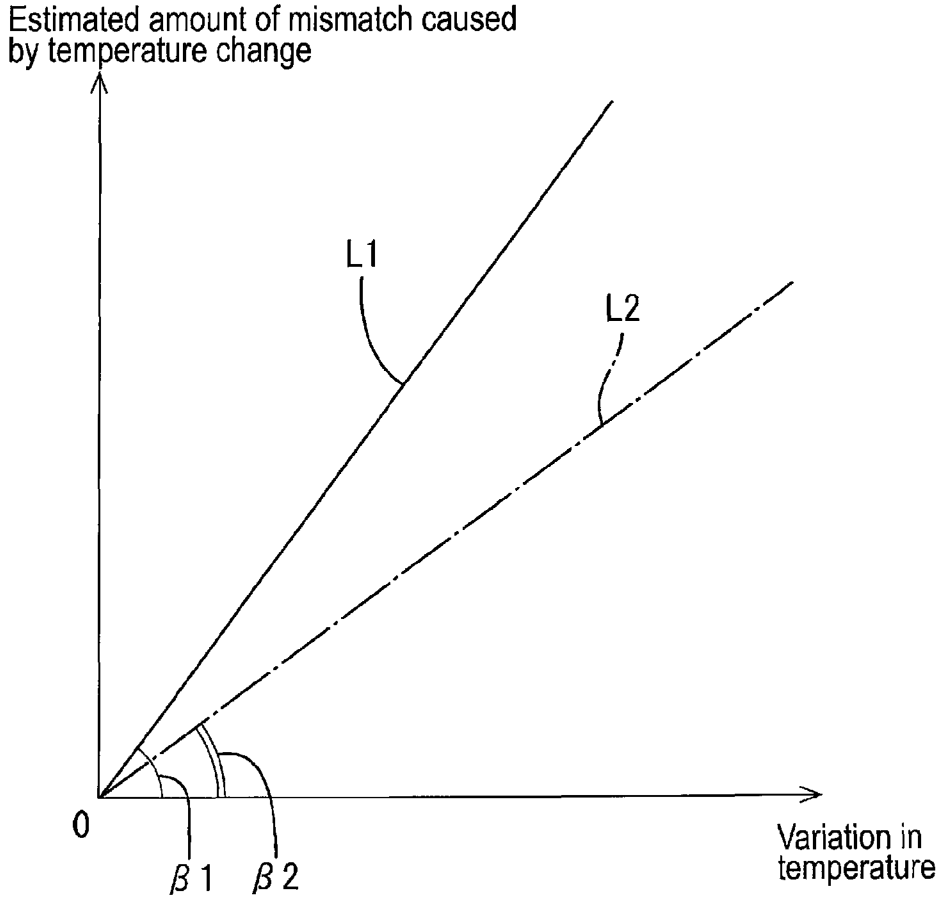
FIG. 11 is a chart illustrating an estimated amount of mismatch caused by a temperature change verses a variation in temperature.

The percentage of the amount of mismatch caused by the temperature change is about 91%(=[200/220]×100), that is, the temperature change causes the mismatch with the amount that takes a large proportion of the total amount. Therefore, the unit amount β of mismatch caused by the temperature change after the alteration can be calculated by equation 3 and 13.6 μm/° C. (β2) is obtained. As illustrated in FIG. 11, a gradient of a straight line for calculating the estimated amount of mismatch caused by the temperature change is altered from 20 μm/° C. (=β1, solid line L1) to 13.6 μm/° C. (=β2, dashed-dotted line L2). If the total numbers of the opening and closing of the cover, the temperature change and the measured amount of mismatch are the same before and after the measurement of the amount of position mismatch, the estimated total amount is 156 μm. Namely, the difference between the estimated total amount and the measured amount of mismatch is reduced in comparison to the difference before the alteration of the unit amount β. As a result, the unnecessary measurement of the amount of position mismatch is less likely to be executed.

By altering the unit amount related to the factor that causes the mismatch with the amount that takes the large proportion, the unit amount related to the factor that affects creating the significant difference between the estimated total amount and the measured is focused and altered. Therefore, the difference is effectively reduced.

If the factor related to the estimated amount that takes a large proportion of the estimated total amount of mismatch is not present (NO in S605), the CPU 40 cannot determine what factor to be focused and what unit amount to be altered. Therefore, it terminates this process without executing the alteration. If the alteration is not performed, the initial unit amount of mismatch β1 is used in the later temperature change related process. The CPU 40 calculates the estimated amount of mismatch caused by the temperature change using the initial unit amount of mismatch β1, and the estimated total amount of mismatch in the measurement request determination process.

By executing the alteration, the unnecessary measurement of the amount of position mismatch is less likely to be executed. However, processing load on the CPU 40 increases by executing the alteration. With the above configuration, the printer 1 can selectively execute the alteration according to the conditions. Namely, the printer 1 can execute the measurement of the amount of mismatch at appropriate time without a significant increase in processing load on the CPU 40.

If the measured amount of mismatch significantly defers from the estimated amount of mismatch, an unnecessary measurement of the amount of mismatch may be executed. To reduce such an unnecessary measurement, the printer 1 alters the unit amount of mismatch used for calculating the estimated amount of mismatch based on the measured amount of mismatch obtained in the measurement of the amount of position mismatch. With this configuration, the unnecessary measurement of the amount of position mismatch is less likely to be executed.

Furthermore, the printer 1 executes the alteration of the unit amount of mismatch only when any one of the conditions is satisfied. If the value related to operation of the printer 1 or the number of times that the measurement of the amount of position mismatch is executed is small and thus the difference between the estimate amount and the measured amount is expected to be relatively small, the alteration is not necessary. With the above configuration, the alteration is less likely to be executed when the difference between the estimated amount and the measured amount is expected to be relatively small.

Still furthermore, the printer 1 calculates the estimated amount of mismatch by multiplying the variation in the factor that causes the mismatch by the unit amount of mismatch. With this configuration, the printer 1 alters the unit amount of mismatch and thus more adequate estimation can be made in comparison to the case that the estimated amount is calculated by adding or subtracting a specific value to or from the reference value.

Other Illustrative Aspects

The technology described herein is not limited to the aspect explained in the above description made with reference to the drawings. For example, the following illustrative aspects may be also included in the technical scope of the present invention.

The technology may be applied to a black and white printer or an intermediate transfer type printer. In this case, the pattern P may be formed on an intermediate transfer body. Moreover, it may be applied to other electrophotographic type image forming apparatus including a polygon scanning type printer or to an inkjet printer.

The pattern P may be formed on a sheet 3 that is electrostatically adsorbed on the belt 13.

The technology may be applied to a position mismatch correction for correcting the position mismatch in the main scanning direction using a known pattern. Furthermore, the technology may be applied to a density mismatch correction. In the density mismatch correction, patterns for a density measurement on the belt 13 by the image forming section 20, and density correction values for correcting the densities of respective colors used for forming an image are updated based on the measurements obtained by the pattern sensor 15 and stored in the NVRAM 43. Causes of the density mismatch include a humidity variation since the last density mismatch measurement and the number of rotation of the development roller.

If the exposure unit of the printer 1 is a polygon scanning type, the printer 1 may include an optical sensor (e.g., a BD sensor) that repeatedly detects laser beams polarized by a polygon mirror. The exposure timing is determined based detection timing of the optical sensor. The intervals of the detection timing vary according to temperature changes. By detecting the variation in the detection timing, the temperature changes in the casing 2 can be detected without the temperature sensor.

A humidity variation, the number of times that consumables (e.g., belt and cartridges) are replaced and a speed of acceleration due to vibration or impact on the printer. In this case, a humidity sensor, a sensor for detecting the replacement of the consumables and an acceleration sensor for detecting the speed of acceleration are example of a data acquisition section.

The differences between the estimated amount of mismatch and the measured amount of mismatch may be reduced by altering the initial estimated amounts of mismatch set for the respective factors that cause the mismatches or the reference value according to the difference. The default estimated amounts of mismatch are examples of the calculation factor.

The total amount of mismatch caused by three or more respective factors may be compared to the reference value. Alternatively, the estimated amount of mismatch caused by a specific factor may be compared to the reference value. In this case, the alteration step S607 in FIG. 10 using Equation 3 is executed without performing the determination step S605.

An amount related to a factor that causes the mismatch with the amount that takes a small proportion of the total amount may be also altered using Equation 3. By altering the amount related to the factor that takes the large proportion more significantly than the amount related to the factor that takes the small proportion, the amount of mismatch caused by the factor that more significantly affect creating the difference between the estimated total amount and the measured amount is more focused and altered. Therefore, the difference can be effectively reduced.

The printer 1 may be configured such that whether to execute the alteration is determined based on a user input through the operation panel 46 or an external computer. Furthermore, whether to execute the alteration may be determined based on whether the position mismatch measurement is successful or failed. Whether the position mismatch measurement is successful or failed can be determined in the same manner as step S309 shown in FIG. 6. If the measurement is successful, the alteration is performed. If the measurement is failed, the alteration is not performed. Whether to execute the alteration may be also determined based on whether the factor that reduces the accuracy of the measurement is present. Whether the factor is present or not is determined in the same manner as step S401 shown in FIG. 8. If the factor is not present, the alteration is performed. If the factor is present, the alteration is not performed.

The printer 1 may include a plurality of CPUs and the controls performed by the CUP 40 can be performed by the plurality of CPUs.

What is claimed is:

1. An image forming apparatus comprising:

an image forming device;

a sensor;

a processor; and memory storing computer readable instructions that, when executed, cause the image forming apparatus to:

acquire a plurality of factors that are causes of a deviation in image forming position;

multiply the factors by coefficient defined in association with the factors, respectively;

estimate amounts of the deviation resulting from the factors, respectively;

determine whether a total of the estimated amounts of the deviation is equal to or larger than the reference value;

in response to determining that the total of the estimated amounts is equal to or larger than the reference value, form a pattern on a member by the image forming device;

detect a position of the pattern by the sensor;

determine an actual deviation in the image forming position based on the detected position;

compare the estimated deviation with the actual deviation; and alter at least the coefficient associated with the factor related to the estimated amount that is larger than the other estimated amounts more than the coefficient associated with the other factors.

2. The image forming apparatus according to claim 1, wherein the memory stores additional computer readable instructions that, when executed by the processor, further cause the image forming apparatus to:

determine whether the image forming apparatus satisfies a predetermined condition;

in response to determining that the image forming apparatus satisfies the predetermined condition, alter the coefficient based on the result of the comparison; and in response to determining that the image forming apparatus does not satisfy the predetermined condition, cancel the alteration of the coefficient.

3. The image forming apparatus according to claim 2, wherein the predetermined condition includes whether a value related to operation of the image forming apparatus is equal to or higher than a specified value.

4. The image forming apparatus according to claim 3, wherein the memory stores additional computer readable instructions that, when executed by the processor, further cause the image forming apparatus to:

after the alteration of the coefficient is canceled, determine whether a condition of the image forming apparatus satisfies the predetermined condition; and in response to determining that the condition of the image forming apparatus satisfies the predetermined condition, alter at least the coefficient based on the actual deviation.

5. The image forming apparatus according to claim 2, wherein the predetermined condition includes whether the number of determination of the actual deviation is equal to or larger than a specified value.

6. The image forming apparatus according to claim 1, wherein the coefficient is a unit deviation that is an estimated deviation per the factor that is a cause of the deviation, wherein the deviation is estimated by multiplying the factor by the unit deviation, and wherein the alteration of the coefficient is performed by altering the unit deviation.

7. An image forming apparatus comprising:

an image forming device;

a sensor;

a processor; and memory storing computer readable instructions that, when executed, cause the image forming apparatus to:

acquire a plurality of factors that are causes of a deviation in image forming density;

multiply the factors by coefficient defined in association with the factors, respectively;

estimate amounts of the deviation resulting from the factors, respectively;

determine whether a total of the estimated amounts of the deviation is equal to or larger than the reference value;

in response to determining that the total of the estimated amounts is equal to or larger than the reference value, form a pattern on a member by the image forming device;

detect a density of the pattern by the sensor;

determine an actual deviation in the image forming density based on the detected density;

compare the estimated deviation with the actual deviation; and alter at least the coefficient associated with the factor related to the estimated amount that is larger than the other estimated amounts more than the coefficient associated with the other factors.

8. The image forming apparatus according to claim 7, wherein the memory stores additional computer readable instructions that, when executed by the processor, further cause the image forming apparatus to:

determine whether the image forming apparatus satisfies a predetermined condition;

in response to determining that the image forming apparatus satisfies the predetermined condition, alter the coefficient based on the result of the comparison; and in response to determining that the image forming apparatus does not satisfy the predetermined condition, cancel the alteration of the coefficient.

9. The image forming apparatus according to claim 8, wherein the predetermined condition includes whether a value related to operation of the image forming apparatus is equal to or higher than a specified value.

10. The image forming apparatus according to claim 9, wherein the memory stores additional computer readable instructions that, when executed by the processor, further cause the image forming apparatus to:

after the alteration of the coefficient is canceled, determine whether a condition of the image forming apparatus satisfies the predetermined condition; and in response to determining that the condition in response to determining that the image forming apparatus satisfies the predetermined condition, alter at least the coefficient based on the actual deviation.

11. The image forming apparatus according to claim 8, wherein the predetermined condition includes whether the number of determination of the actual deviation is equal to or larger than a specified value.

12. The image forming apparatus according to claim 7, wherein the coefficient is a unit deviation that is an estimated deviation per the factor that is a cause of the deviation, wherein the deviation is estimated by multiplying the factor by the unit deviation, and wherein the alteration of the coefficient is performed by altering the unit deviation.

13. A non-transitory computer readable medium storing instructions that, when executed by a processor, control an image forming device with a sensor to perform operations comprising:

acquire a plurality of factors that are causes of a deviation in image forming position;

multiply the factors by coefficient defined in association with the factors, respectively;

estimate amounts of the deviation in the image forming position based on a result of the multiplication;

determine whether a total of the estimated amounts of the deviation is equal to or larger than a reference value;

in response to determining that the total of the estimated amounts is equal to or larger than the reference value, form a pattern on a member by the image forming device;

detect a position of the pattern by the sensor;

determine an actual deviation in the image forming position based on the detected position;

compare the estimated deviation with the actual deviation; and alter at least the coefficient associated with the factor related to the estimated amount that is larger than the other estimated amounts more than the coefficient associated with the other factors.

14. A non-transitory computer readable medium storing instructions that, when executed by a processor, control an image forming device with a sensor to perform operations comprising:

acquire a plurality of factors that are causes of a deviation in image forming density;

multiply the factors by coefficient defined in association with the factors, respectively;

estimate amounts of the deviation in the image forming density based on a result of the multiplication;

determine whether a total of the estimated amounts of the deviation is equal to or larger than a reference value;

in response to determining that the total of the estimated amounts is equal to or larger than the reference value, form a pattern on a member by the image forming device;

detect a density of the pattern by the sensor;

determine an actual deviation in the image forming density based on the detected density;

compare the estimated deviation with the actual deviation; and alter at least the coefficient associated with the factor related to the estimated amount that is larger than the other estimated amounts more than the coefficient associated with the other factors.

* * * * *